UNITED STATES PATENT OFFICE 2,562,114

OXAZOLINE COMPOUNDS

George W. Moersch and Allen C. Moore, Detroit, Mich., assignors to Parke, Davis & Company, Detroit, Mich., a corporation of Michigan No Drawing. Application April 29, 1950, Serial No. 159,122

11 Claims. (Cl. 260—307.6)

This application is a continuation-in-part of our copending application Serial No. 66,594, filed December 21, 1948, now U. S. Patent 2,513,346, and the invention relates to a new class of oxazoline compounds and to methods for obtaining the same. More particularly, the invention relates to $\Delta^2$-oxazoline compounds having the formula,

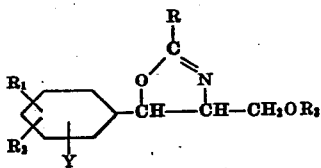

wherein R is a lower alkyl, halogenated lower alkyl, phenyl phenalkyl, alkylated phenyl, alkoxyphenyl, nitrated phenyl or a halogenated phenyl radical, $R_1$ and $R_2$ are the same or different and represent hydrogen, halogen, lower alkyl or lower alkoxy radicals, $R_3$ is hydrogen or an acyl radical such as a lower aliphatic acyl, halogenated lower aliphatic acyl, benzoyl, substituted benzoyl, araliphatic acyl and the like radicals and Y is hydrogen or a nitro group.

It will be apparent to those skilled in the art that the products of the invention, as well as the amino diol compounds which we use as starting materials for their production, exist in structural or disastereoisomeric as well as optical isomeric form. The term "structural" isomer or form as used herein refers to the cis or trans, that is, the planar relationship of the phenyl and —$CH_2OR_3$ groups to the plane of the oxazoline ring. To differentiate between these two diastereoisomers we will subsequently refer to the cis compounds as the "regular" (reg.) series or form and to the trans diastereoisomers as the "pseudo" ($\psi$) series or form. Such cis compounds are those products wherein both the phenyl and —$CH_2OR_3$ groups are on the same side of the plane of the oxazoline ring. Conversely, the trans or pseudo compounds are those wherein the two groups are on opposite sides of the plane of the oxazoline ring.

Both the regular and pseudo forms exist as racemates of the optically active dextro (d) and levo (l) rotary isomers as well as in the form of the individual or separate dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

The products of the invention can be prepared in a number of different ways. One method which has been found to give particularly high yields of the desired $\Delta^2$-oxazoline products consists in reacting an amino diol compound of formula,

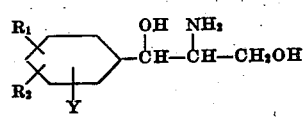

with an imino ether compound of formula,

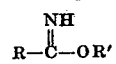

or salt thereof; where R' is an alkyl, phenyl or phenalkyl radical and R, $R_1$, $R_2$ and Y have the same significance as given above. The reaction is carried out at a temperature below about 50° C. and preferably at about 20–35° C. A wide variety of solvents such as water, lower aliphatic alcohols both aqueous and anhydrous, chloroform, ether and the like can be employed. Since in many instances the free bases of the imino ethers are rather unstable, it is preferable to use the imino ether compound in the form of a mineral acid salt. The amino diol compound can be employed in either the free base or salt form, although when a salt is used one equivalent of a basic substance such as aqueous ammonia, sodium bicarbonate, sodium hydroxide and the like should be added to the reaction mixture to liberate the free amino diol compound in situ. In the case of the more unstable imino ether compounds it is also preferable to use an anhydrous solvent for the reaction. The transformation which takes place can be diagrammatically represented as follows:

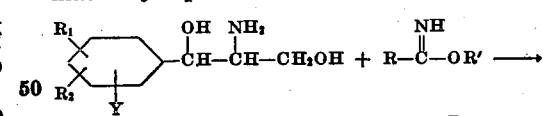

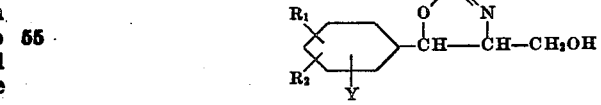

The $\Delta^2$-oxazoline products of the invention wherein $R_3$ is an acyl radical are best produced by acylation of the corresponding 4-hydroxymethyl-Δ²-oxazoline. This acylation can be carried out by treating the 4-hydroxymethyl-Δ²-oxazoline compound with an excess of the acyl halide or anhydride under anhydrous conditions. In most instances it is preferable to employ a basic catalyst such as pyridine, N,N-dimethyl aniline, N-ethyl piperidine, triethylamine and the like. The acylation can also be carried out in an aqueous reaction mixture using the acyl halide or anhydride in conjunction with a basic catalyst such as an alkali metal hydroxide, alkali metal carbonate or the organic catalysts enumerated above. The reaction involved can be diagrammatically illustrated as follows:

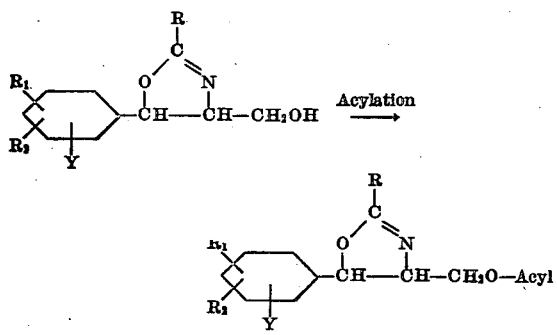

where R, R₁, R₂ and Y have the same significance as given above.

It has also been found that the products wherein R₃ and Y are hydrogen can, in addition to the methods described above, be prepared by the reduction of the corresponding 4-carboalkoxy-Δ²-oxazoline. The reduction is carried out using lithium aluminum hydride as the reductant in a substantially anhydrous, non-hydroxylic, organic solvent. Some of the solvents which can be used for the reaction are ether, benzene, dioxane, toluene and tetrahydrofuran. After the reaction is complete, the excess lithium aluminum hydride is decomposed by the addition of water and the desired 4-hydroxymethyl-Δ²-oxazoline compound isolated as hereinafter described. The relative amount of lithium aluminum hydride used in the process can be varied within rather wide limits, but it is preferable in all cases to use more than the theoretical amount necessary to bring about the reduction. The process can be diagrammatically depicted as follows:

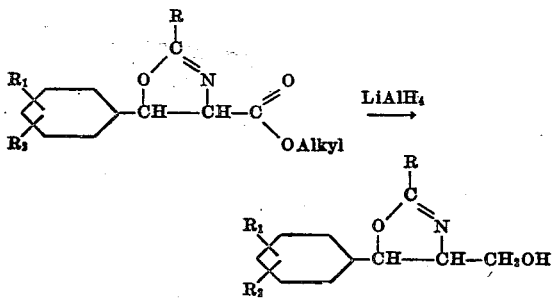

wherein R, R₁ and R₂ have the same significance as given above.

The products of the invention can also be obtained in the pseudo structural form by the action of a thionyl halide on a regular amino diol compound having the formula,

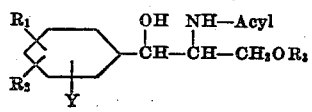

where R₁, R₂, R₃ and Y have the same significance as given above.

The products of the invention are of particular value in the preparation of the very valuable antibiotic, chloramphenicol, and other therapeutically valuable organic compounds structurally related thereto.

The invention is illustrated by the following examples.

Example 1

A mixture consisting of 2.12 g. of (dl)-ψ-1-phenyl-2-aminopropane-1,3-diol and 2 g. of acetimino ethyl ether hydrochloride in 25 cc. of water is shaken for about one-half hour. The crystalline product is collected and purified by recrystallization from ethyl acetate; M. P. 114° C. The product thus obtained is (dl)-ψ-2-methyl-4-hydroxymethyl-5-phenyl-Δ² - oxazoline which has the formula,

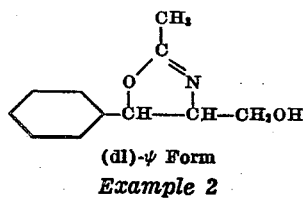

(dl)-ψ Form

Example 2

A mixture consisting of 1.5 g. of (dl)-ψ-2-methyl-4-hydroxymethyl-5-phenyl-Δ²-oxazoline, 12 cc. of dry pyridine and 2 cc. of acetic anhydride is allowed to stand overnight at room temperature. The reaction mixture is treated with cold water and the oil which separates extracted with ethyl acetate. The ethyl acetate extracts are dried, the ethyl acetate distilled and the residual crystalline product purified by recrystallization from methanol-water mixture; M. P. 160° C. The product thus obtained is (dl)-ψ-2-methyl-4-acetoxymethyl-5-phenyl-Δ²-oxazoline which has the formula,

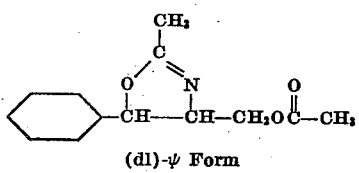

(dl)-ψ Form

Example 3

(a) A mixture consisting of 2 g. of benzimino ethyl ether hydrochloride, 3.35 g. of (dl)-ψ-1-phenyl-2-aminopropane-1,3-diol and 25 cc. of water is shaken at room temperature for a few minutes. The oil which separates soon crystallizes. The crystalline product is collected, washed with water and purified by recrystallization from ethyl acetate; M. P. 157° C. The product thus obtained is (dl)-ψ-2,5-diphenyl-4-hydroxymethyl-Δ²-oxazoline which has the formula,

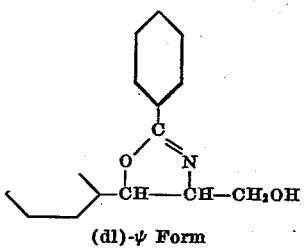

(dl)-ψ Form (b) 2.95 g. of (dl)-ψ-2,5-diphenyl-4-carbethoxy-Δ²-oxazoline in 100 cc. of dry ether is added slowly to a solution of 0.2 g. of lithium aluminum hydride in 250 cc. of dry ether over a period of three hours. The reaction mixture is stirred for one hour and decomposed by the cautious addition of 50 cc. of water. The reaction mixture is evaporated to dryness in vacuo and the residue extracted with several portions of cold, absolute ethanol. The alcohol extracts are combined, evaporated to dryness to obtain a white solid which after recrystallization from ethyl acetate melts at 156° C. This product is (dl)-ψ-2,5-diphenyl-4-hydroxymethyl-Δ²-oxazoline and is identical with that obtained by the method described in (a) above.

Example 4

8.5 g. of (d)-ψ-1-p-nitrophenyl-2-aminopropane-1,3-diol and 7.5 g. of benzimino ethyl ether hydrochloride in 56 cc. of water is shaken at room temperature for fifteen minutes. The reaction mixture is allowed to stand overnight, diluted with 200 cc. of water and the crystalline product collected. This product which is (d)-ψ-2-phenyl-4-hydroxymethyl-5-p-nitrophenyl-Δ²-oxazoline can be recrystallized from ethyl acetate; M. P. 226–7° C. The formula of this product is,

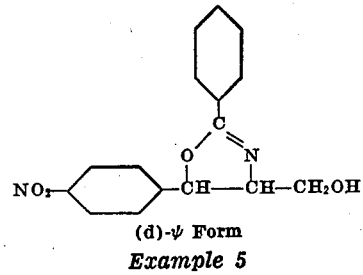

(d)-ψ Form

Example 5

1 g. of (d)-ψ-2-phenyl-4-hydroxymethyl-5-p-nitrophenyl-Δ²-oxazoline dissolved in 10 cc. of dry pyridine and 2 cc. of acetic anhydride is allowed to stand overnight at room temperature. The reaction mixture is treated with a small amount of alcohol and evaporated to dryness in vacuo. The residual oil is stirred with water until it crystallizes and the crystalline product purified by recrystallization from methanol or ethanol. The product can also be purified by recrystallization from ether; M. P. 80° C. The product thus obtained is (d)-ψ-2-phenyl-4-acetoxymethyl-5 - p - nitrophenyl - Δ²-oxazoline which has the formula,

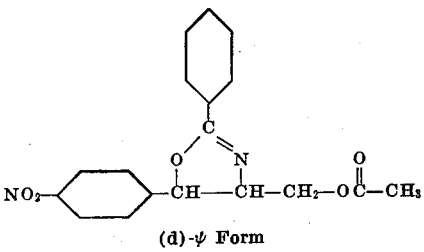

(d)-ψ Form

The corresponding 4-benzoyloxymethyl compound is obtained by substituting benzoyl chloride for the acetic anhydride used above. It melts at 154° C.

Example 6

A mixture consisting of 8.5 g. of (1)-ψ-1-p-nitrophenyl-2-aminopropane-1,3-diol, 5 g. of acetimino ethyl ether hydrochloride and 25 cc. of cold water is shaken at room temperature for one-half hour. The reaction mixture is allowed to stand for an additional one-half hour and the crystalline solid collected. Recrystallization from ethyl acetate yields the desired (l) - ψ - 2-methyl-4-hydroxymethyl-5-p-nitrophenyl-Δ²-oxazoline in pure form; M. P. 147° C.; [α]₂₅ᴅ=−58°. The formula of this product is,

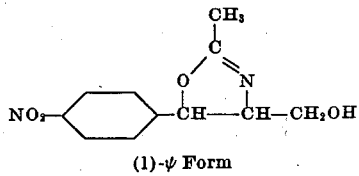

(l)-ψ Form

Example 7

A mixture consisting of 8.5 g. of (d)-ψ-1-p-nitrophenyl-4-aminopropane-1,3-diol, 5 g. of acetimino ethyl ether hydrochloride and 25 cc. of cold water is shaken for one-half hour at room temperature. The reaction mixture is allowed to stand for an additional one-half hour and the crystalline product collected. Recrystallization from ethyl acetate yields the desired (d)-ψ-2-methyl-4-hydroxymethyl-5-p-nitrophenyl-Δ²-oxazoline of formula,

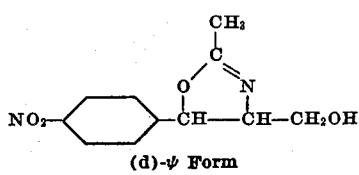

(d)-ψ Form in pure form; M. P. 145° C.; [α]₂₅ᴅ=+59°.

Example 8

A mixture consisting of 17 g. of (dl)-ψ-1-p-nitrophenyl-2-aminopropane-1,3-diol, 14 g. of acetimino ethyl ether hydrochloride and 140 cc. of ethanol is shaken intermittently over a period of one hour. The reaction mixture is chilled and the crystalline product collected. This product which is (dl)-ψ-2-methyl-4-hydroxymethyl - 5 - p-nitrophenyl-Δ²-oxazoline of formula,

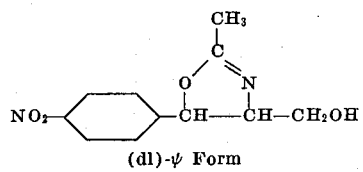

(dl)-ψ Form can be purified, if desired, by recrystallization from ethanol; M. P. 157–8° C.

Example 9

A mixture consisting of 8.5 g. of (dl)-reg.-1-p-nitrophenyl-2-aminopropane-1,3-diol, 7 g. of acetimino ethyl ether hydrochloride and 75 cc. of ethanol is shaken at room temperature for one hour. The reaction mixture is cooled and the crystalline (dl)-reg.-2-methyl-4-hydroxymethyl-5-p-nitrophenyl-Δ²-oxazoline collected. This product which has the formula,

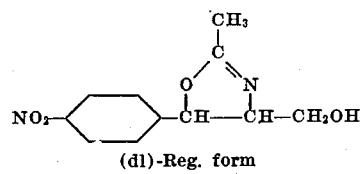

(dl)-Reg. form can be purified by recrystallization from ethanol; M. P. 197–8° C.

Example 10

1.8 g. of (dl) - ψ - 2,5-diphenyl-4-hydroxymethyl-Δ²-oxazoline is added to a mixture of 2 cc. of benzoyl chloride and 10 cc. of dry pyridine. The reaction mixture is allowed to stand overnight, treated with 50 cc. of alcohol and evaporated to dryness in vacuo. The residual oil is taken up in ethyl acetate, the ethyl acetate extract concentrated to the point of crystallization, cooled and the crystalline product collected. Recrystallization from methanol-water mixture yields the desired (dl)-$\psi$ - 2,5 - diphenyl-4-benzoyloxymethyl-$\Delta^2$-oxazoline in pure form. The formula of this product is,

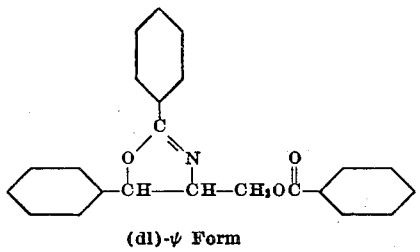

(dl)-$\psi$ Form

*Example 11*

A mixture consisting of 8.4 g. of (dl)-reg.-1-phenyl-2-aminopropane-1,3-diol, 9.3 g. of benzimino ethyl ether hydrochloride and 75 cc. of water is shaken at room temperature for about one-half hour. The reaction mixture is allowed to stand for one hour and the crystalline (dl)-reg. - 2,5-diphenyl-4-hydroxymethyl-$\Delta^2$-oxazoline collected. Recrystallization from ethyl acetate yields the desired product in pure form. The formula of this product is,

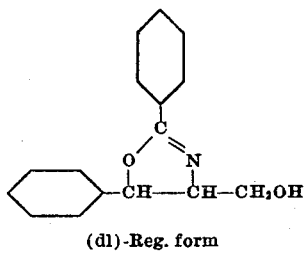

(dl)-Reg. form

*Example 12*

A mixture comprosed of 1.8 g. of (dl)-reg.-2,5-diphenyl-4-hydroxymethyl-$\Delta^2$-oxazoline, 2 cc. of benzoyl chloride and 10 cc. of dry pyridine is allowed to stand at room temperature overnight. The reaction mixture is treated with cold water, the oily layer separated or extracted with ethyl acetate and the ethyl acetate extract evaporated to the point of crystallization. The gummy solid or oily product is purified by recrystallization from methanol-water mixture to obtain the desired (dl) - reg.-2,5-diphenyl-4-benzoyloxymethyl-$\Delta^2$-oxazoline in pure form. The formula of this product is,

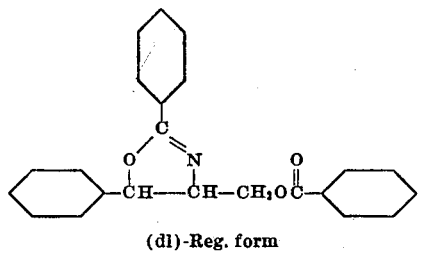

(dl)-Reg. form

*Example 13*

A mixture consisting of 5.9 g. of (dl)-$\psi$-1-p-iodophenyl-2-aminopropane-1,3-diol, 4.02 g. of butyrimino ethyl ether hydrobromide and 20 cc. of cold water is shaken at room temperature for one-half hour. The reaction mixture is allowed to stand for an additional half-hour and the solid (dl) - $\psi$ - 2-n-propyl-4-hydroxymethyl-5-p-iodophenyl-$\Delta^2$-oxazoline collected. Recrystallization from the ethyl acetate yields the desired product in pure form. The formula of this product is,

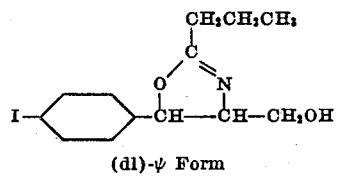

(dl)-$\psi$ Form

*Example 14*

A mixture consisting of 4.5 g. of (dl)-$\psi$-1-o-methyl-2-aminopropane-1,3-diol, 4.7 g. of phenacetimino methyl ether hydrochloride and 15 cc. of cold water is shaken for one-half hour at room temperature. The reaction mixture is allowed to stand at room temperature for about another hour and then the crystalline (dl)-$\psi$-2-benzyl-4-hydroxymethyl - 5-o-methylphenyl-$\Delta^2$-oxazoline collected. If desired, this product which has the formula,

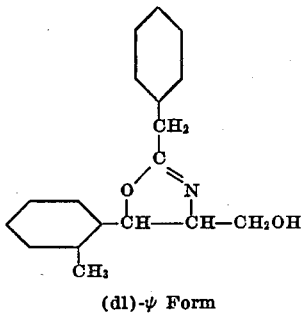

(dl)-$\psi$ Form can be purified by recrystallization from ethyl acetate.

*Example 15*

A mixture consisting of 10.6 g. of (dl)-$\psi$-1-p-nitrophenyl-2-aminopropane-1,3-diol, 7.3 g. of chloroacetiminomethyl ether hydrochloride and 50 cc. of dry chloroform is shaken at room temperature for about one-half hour. The reaction mixture is filtered to remove the insoluble ammonium chloride and the chloroform distilled from the filtrate in vacuo. The product thus obtained is (dl)-$\psi$-2-chloromethyl-4-hydroxymethyl - 5 - p-nitrophenyl-$\Delta^2$-oxazoline. This product which has the formula,

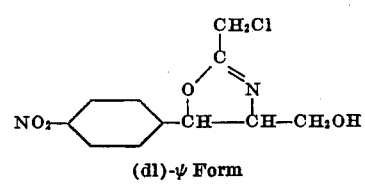

(dl)-$\psi$ Form can be purified by recrystallization from ethyl acetate.

*Example 16*

A mixture consisting of 9.8 g. of (dl)-$\psi$-1-(3',4'-dimethylphenyl-2-aminopropane-1,3-diol, 12.2 g. of p-methylbenzimino ethyl ether hydrobromide and 150 cc. of ethanol is shaken at room temperature for about one hour. The reaction mixture is allowed to stand for a short time and then the crystalline (dl)-$\psi$-2-p-toluyl-4-hydroxymethyl- 5-(3',4'-dimethylphenyl)-Δ²-oxazoline collected. This product which has the formula,

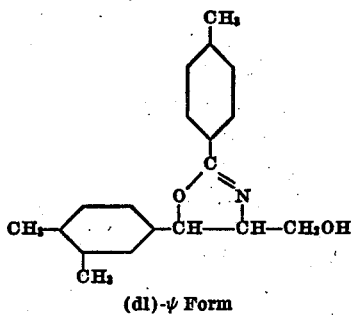

(dl)-ψ Form can be purified by recrystallization from ethyl acetate.

Example 17

A mixture consisting of 12.3 g. of (dl)-reg.-1-p-bromophenyl-2-aminopropane-1,3-diol, 10.1 g. of o-methoxybenzimino methyl ether hydrochloride and 100 cc. of alcohol is shaken at room temperature for one and one-half hours. The reaction mixture is diluted with four volumes of water and the (dl)-reg.-2-(o-methoxyphenyl)-4-hydroxymethyl - 5 - p-bromophenyl-Δ²-oxazoline collected. If desired, this product can be purified further by recrystallization from ethyl acetate. Its formula is,

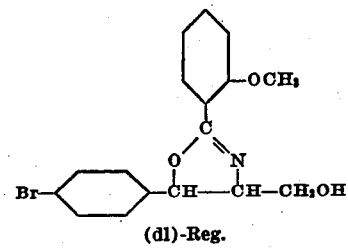

(dl)-Reg.

Example 18

A mixture consisting of 9.8 g. of (dl)-ψ-1-m-methoxy-2-aminopropane-1,3-diol, 10.4 g. of m-chlorobenzimino methyl ether hydrochloride and 100 cc. of ethanol is shaken at room temperature for about one hour. The reaction mixture is diluted with an equal volume of water, allowed to stand for one hour and then the crystalline-(dl)-ψ-2-m-chloro-4-hydroxymethyl - 5 - m-methoxy-Δ²-oxazoline collected. This product can be purified further by recrystallization from ethyl acetate. Its formula is,

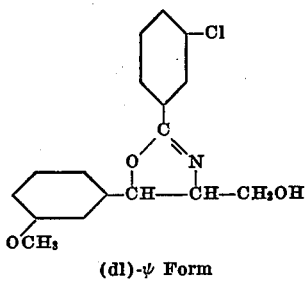

(dl)-ψ Form

Example 19

A mixture consisting of 1.5 g. of m-chlorophenyl-4-hydroxymethyl - 5 - m-methoxyphenyl-Δ²-oxazoline, 12 cc. of dry pyridine and 2.5 cc. of propionic anhydride is allowed to stand overnight at room temperature. The reaction mixture is treated with cold water and the oil which separates extracted with ethyl acetate. The ethyl acetate extract is evaporated to dryness and the oil induced to crystallize by rubbing. The product is purified by recrystallization from water-methanol mixture. The product thus obtained is (dl)-ψ-2-m-chlorophenyl-4-propionyloxymethyl-5-m-methoxyphenyl-Δ²-oxazoline which has the formula,

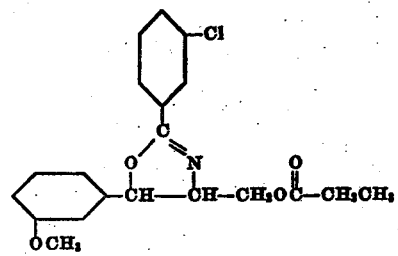

(dl)-ψ Form

Example 20

A mixture consisting of 1.5 g. of (dl)-ψ-2-n-propyl-4-hydroxymethyl-5-p - iodophenyl-Δ²-oxazoline, 2.5 g. of p-methylbenzoyl chloride and 12 cc. of dry pyridine is allowed to stand overnight at room temperature. The reaction mixture is treated with water, the oil which separates from the solution collected and taken up in ethyl acetate. The ethyl acetate extract is dried and evaporated in vacuo to obtain the desired (dl)-ψ-2-n-propyl-4-toluyloxymethyl-5-p - iodo-Δ²-oxazoline in crude form. The product is crystallized from methanol or methanol-water mixture. The formula of this product is,

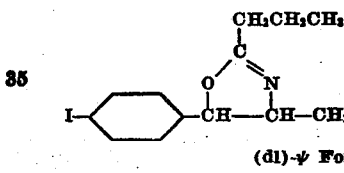

(dl)-ψ Form

Example 21

A mixture consisting of 7.1 g. of (dl)-ψ-1-p-nitrophenyl-2-aminopropane-1,3-diol, 9.2 g. of m-nitrobenzimino ethyl ether hydrobromide and 100 cc. of ethanol is shaken at room temperature for one hour. The reaction mixture is allowed to stand for about another hour, cooled and the crystalline (dl)-ψ-2-m-nitrophenyl-4-hydroxymethyl-5-p-nitrophenyl - Δ² - oxazoline collected. Recrystallization from ethanol yields the pure product. This compound has the formula,

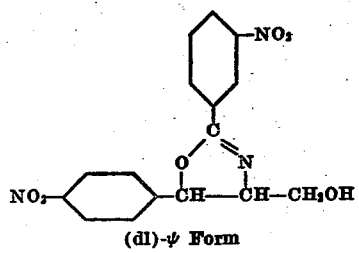

(dl)-ψ Form

Example 22

(a) 15 g. of (l)-ψ-2-dichloromethyl-5-phenyl-4-carbethoxy-Δ²-oxazoline dissolved in 400 cc. of dry ether is added to a solution of 1 g. of lithium aluminum hydride in 1 liter of dry ether over a period of about three hours. The reaction mixture is stirred for about an hour and then the excess lithium aluminum hydride decomposed by the cautious addition of 225 cc. of cold water. The reaction mixture is evaporated to dryness in vacuo and the residue exhaustively extracted with absolute ethanol. The alcohol extracts are dried and the alcohol distilled to obtain the desired (l)-ψ-2-dichloromethyl-5-phenyl- 4 -hydroxymethyl- $\Delta^2$-oxazoline. This product which has the formula,

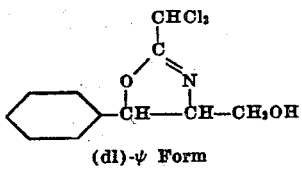

(dl)-$\psi$ Form can be purified, if desired, by recrystallization from ethyl acetate.

(b) 8.3 g. of (l)-$\psi$-1-phenyl-2-aminopropane-1,3-diol is shaken with 9.1 g. of dichloroacetimino ethyl ether hydrochloride in 100 cc. of chloroform at room temperature for one-half hour. The chloroform is distilled and the crystalline (l)-$\psi$-2-dichloromethyl-5-phenyl-4-hydroxymethyl-$\Delta^2$-oxazoline collected and purified by recrystallization from ethyl acetate. This product is the same as that obtained in (a) above.

*Example 23*

10 g. of (l)-$\psi$-2-dichloromethyl-5-phenyl-4-hydroxymethyl-$\Delta^2$-oxazoline is added to 75 cc. of dry pyridine and 15 cc. of acetic anhydride. The reaction mixture is allowed to stand overnight at room temperature and then treated with cold water. The oil which separates from the solution is taken up in ethyl acetate, the ethyl acetate solution dried and the ethyl acetate distilled. The residual product which is (l)-$\psi$-2-dichloromethyl-5-phenyl-4-acetoxymethyl-$\Delta^2$-oxazoline of formula,

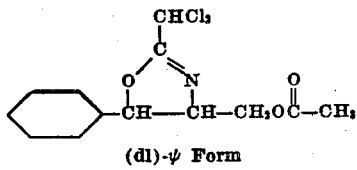

(dl)-$\psi$ Form is purified by recrystallization from methanol-water mixture.

*Example 24*

5 g. of (dl)-reg.-1-p-nitrophenyl-2-acetamido-3-acetoxypropane-1-ol is added to 15 cc. of thionyl chloride at 30° C. and the resulting solution allowed to stand for about fifteen minutes. The reaction mixture is poured into 200 cc. of dry ether and the mixture allowed to stand overnight at 10° C. The crystalline hydrochloride salt of (dl)-$\psi$-2-methyl-4-acetoxymethyl-5-p-nitrophenyl-$\Delta^2$-oxazoline is collected, dissolved in absolute methanol at room temperature and neutralized with gaseous ammonia. The solution is evaporated to dryness in vacuo and the residual (dl)-$\psi$-2-methyl-4-acetoxymethyl-5-p-nitrophenyl-$\Delta^2$-oxazoline of formula,

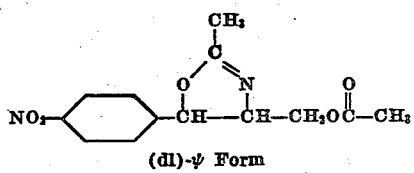

(dl)-$\psi$ Form purified by recrystallization from aqueous methanol.

By using 5 g. of (dl)-reg.-1-phenyl-2-acetamido-3-acetoxypropane-1-ol in the above procedure instead of the (dl)-reg.-1-p-nitrophenyl-2-acetamido-3-acetoxypropane-1-ol, one obtains (dl)-$\psi$-2-methyl-4-acetoxymethyl-5-phenyl-$\Delta^2$-oxazoline; M. P. 160° C. This product is identical with that produced by the method described in Example 2.

What we claim is:
1. A compound of the formula,

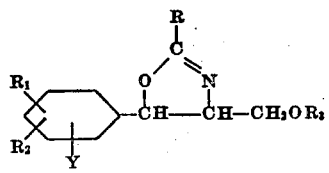

where R is a member of the class consisting of lower alkyl, halogenated lower alkyl, phenyl, phenalkyl, alkylated phenyl, alkoxy phenyl, nitrated phenyl and halogenated phenyl radicals; $R_1$ and $R_2$ are members of the class consisting of hydrogen, halogen, lower alkyl and lower alkoxy radicals; $R_3$ is a member of the class consisting of hydrogen and carboxylic acid acyl radicals and Y is a member of the class consisting of hydrogen and —$NO_2$.

2. A compound of the formula,

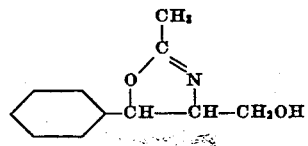

3. A compound of the formula,

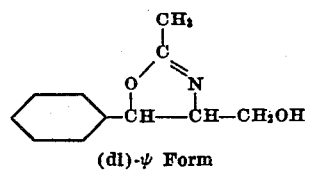

(dl)-$\psi$ Form

4. A compound of the formula,

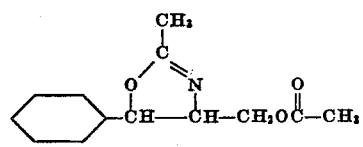

5. A compound of the formula,

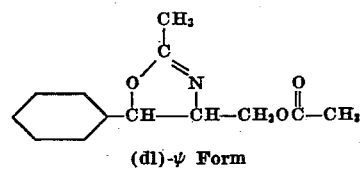

(dl)-$\psi$ Form

6. A compound of the formula,

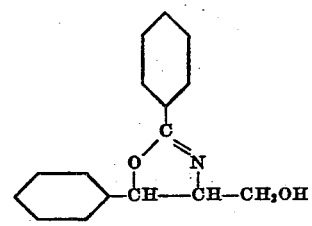

7. A compound of the formula,

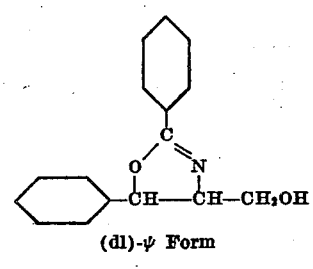

(dl)-$\psi$ Form

8. A compound of the formula,
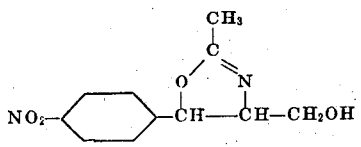
9. A compound of the formula,
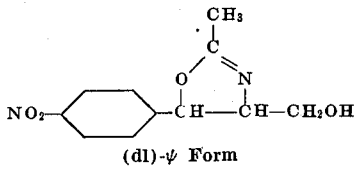
(dl)-ψ Form
10. A compound of the formula,
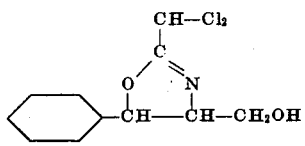
11. A compound of the formula,
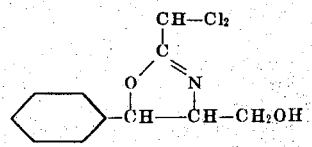
(dl)-ψ Form
GEORGE W. MOERSCH.
ALLEN C. MOORE.
REFERENCES CITED
The following references are of record in the file of this patent:
UNITED STATES PATENTS
| Number | Name | Date |
|---|---|---|
| 2,372,409 | Tryon | Mar. 27, 1945 |
| 2,504,951 | Tryon | Apr. 25, 1950 |